United States Patent
Beall et al.

(10) Patent No.: US 10,444,805 B1
(45) Date of Patent: Oct. 15, 2019

(54) TAMPER-EVIDENT BRACE FOR JUNCTURE OF CASE PIECES

(71) Applicant: Amazon Technologies, Inc., Seattle, WA (US)

(72) Inventors: Christopher Strickland Beall, Woodinville, WA (US); Frank Charles Paterra, Kirkland, WA (US); Darin Lee Frink, Lake Tapps, WA (US); Robert Hastings, Seattle, WA (US); Scott Song, Seattle, WA (US); Felix An, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 15/360,792

(22) Filed: Nov. 23, 2016

(51) Int. Cl.
| | |
|---|---|
| *G06F 1/18* | (2006.01) |
| *B65D 6/00* | (2006.01) |
| *B65D 25/20* | (2006.01) |
| *B65D 79/02* | (2006.01) |
| *G06K 19/07* | (2006.01) |

(52) U.S. Cl.
CPC .............. *G06F 1/182* (2013.01); *B65D 11/10* (2013.01); *B65D 25/205* (2013.01); *B65D 79/02* (2013.01); *G06K 19/0723* (2013.01)

(58) Field of Classification Search
CPC ...... B65D 79/02; B65D 11/10; B65D 25/205; Y10T 292/42; Y10T 292/438; Y10T 292/444; Y10T 292/49; Y10T 292/491; Y10T 292/494; Y10T 292/497; Y10T 292/498; Y10T 292/499; E05B 39/005; E05B 39/02; E05B 65/0075; E05B 65/0092; E05B 65/48; E05B 65/50; E05B 65/52; E05G 1/10; E05C 19/06; G06K 19/0723; G06F 1/182
USPC ......... 206/459.5; 292/307 A, 307 R; 70/285, 70/333, 439–440; 283/80–81, 98–101; 40/649, 6
See application file for complete search history.

(56) References Cited

U.S. PATENT DOCUMENTS

| | | | | |
|---|---|---|---|---|
| 2,013,299 | A * | 9/1935 | Byrne | G09F 3/0341 206/459.1 |
| 5,551,729 | A * | 9/1996 | Morgan | G09F 3/0292 283/72 |
| 5,568,951 | A * | 10/1996 | Morgan | B65D 55/02 283/98 |
| 5,971,262 | A * | 10/1999 | Moore | B65D 5/4295 229/102 |
| 8,052,180 | B1 * | 11/2011 | Lassen | B65D 90/22 292/307 A |
| 8,646,198 | B2 * | 2/2014 | Atherton | A45C 13/02 283/98 |

(Continued)

*Primary Examiner* — Chun Hoi Cheung
*Assistant Examiner* — Brijesh V. Patel
(74) *Attorney, Agent, or Firm* — Kilpatrick Townsend & Stockton LLP

(57) ABSTRACT

A brace can be installed over a juncture between releasably joined case pieces. The brace includes a first tab and a second tab interconnected by a transition portion. The tabs are arranged to deform or break apart from one another along the transition portion in response to relative rotation between the case pieces. The deformation or breakage along the transition portion provides a tamper-evident indication of the case having been opened by rotation for access to the interior of the case since the brace was installed on the case.

20 Claims, 9 Drawing Sheets

(56) References Cited

U.S. PATENT DOCUMENTS

| | | | |
|---|---|---|---|
| 2006/0022027 A1* | 2/2006 | Grebinski | B65D 55/06 229/125.37 |
| 2007/0201191 A1* | 8/2007 | Takahashi | H05K 7/1417 361/600 |
| 2015/0274388 A1* | 10/2015 | Gordon | B65D 55/14 53/405 |
| 2015/0368930 A1* | 12/2015 | Mullis | E05B 17/00 70/263 |

* cited by examiner

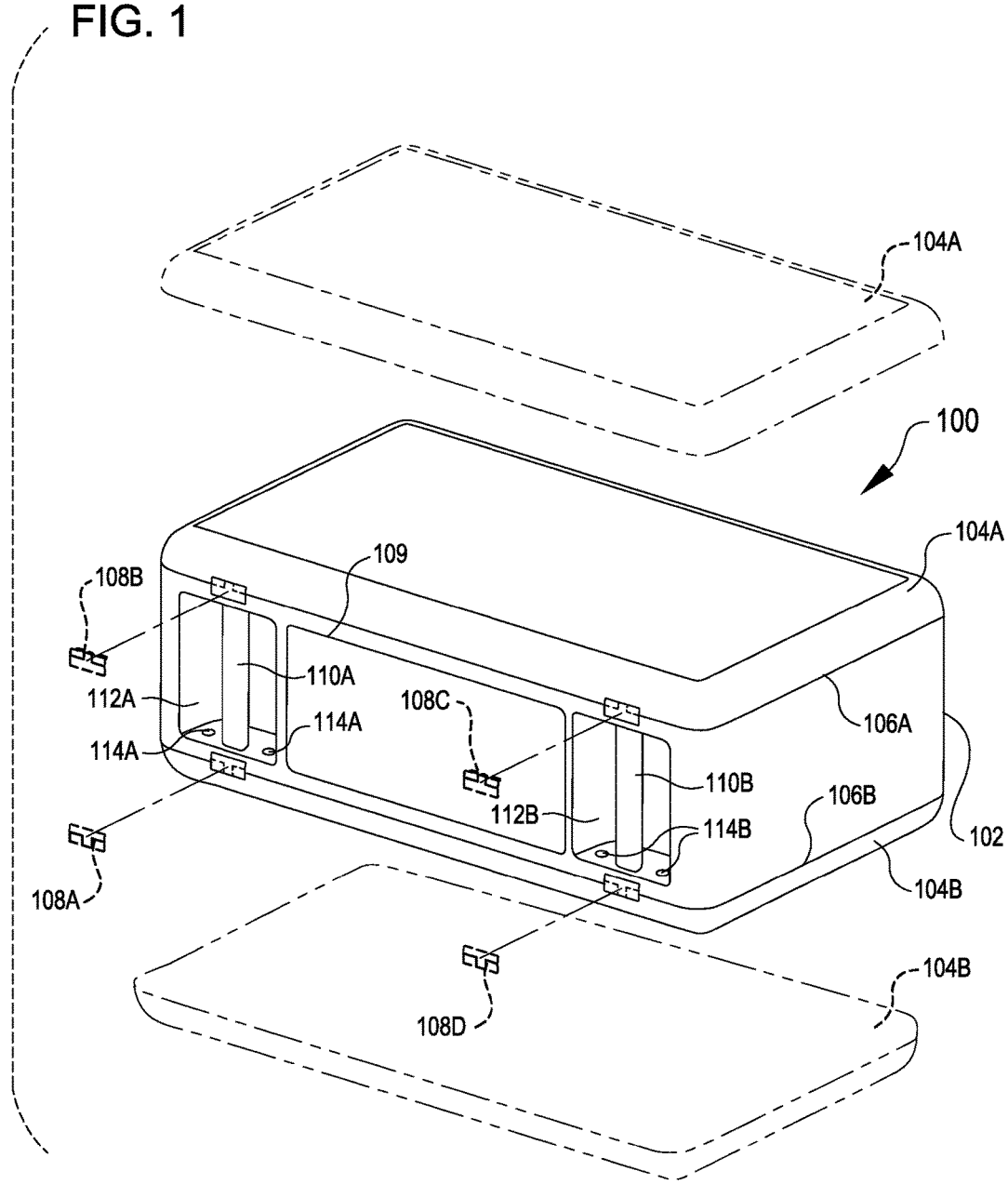

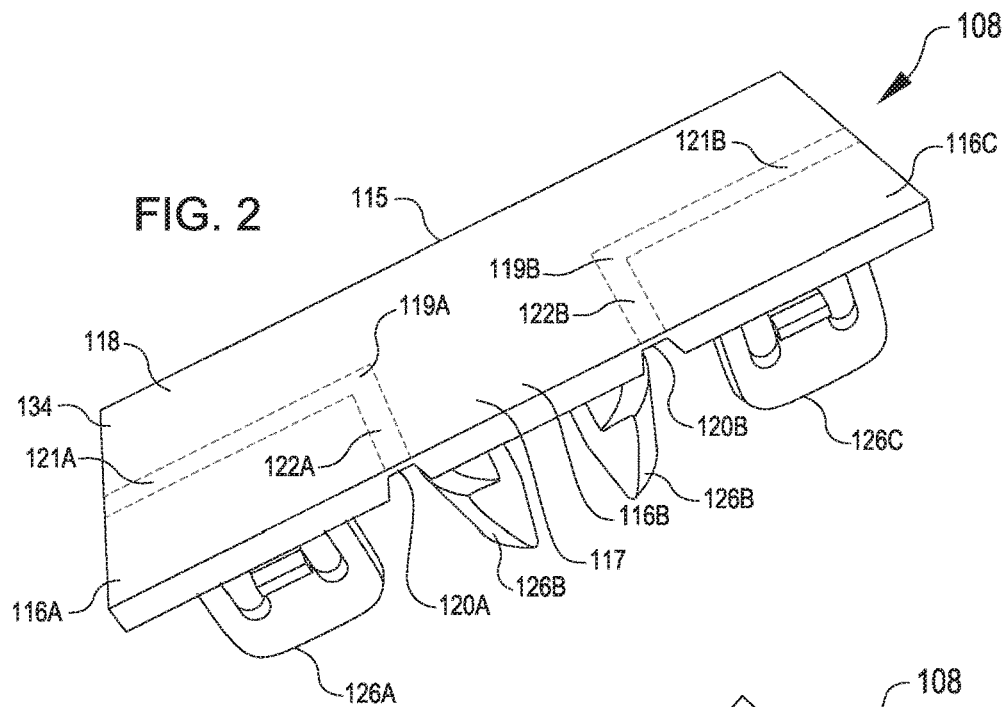
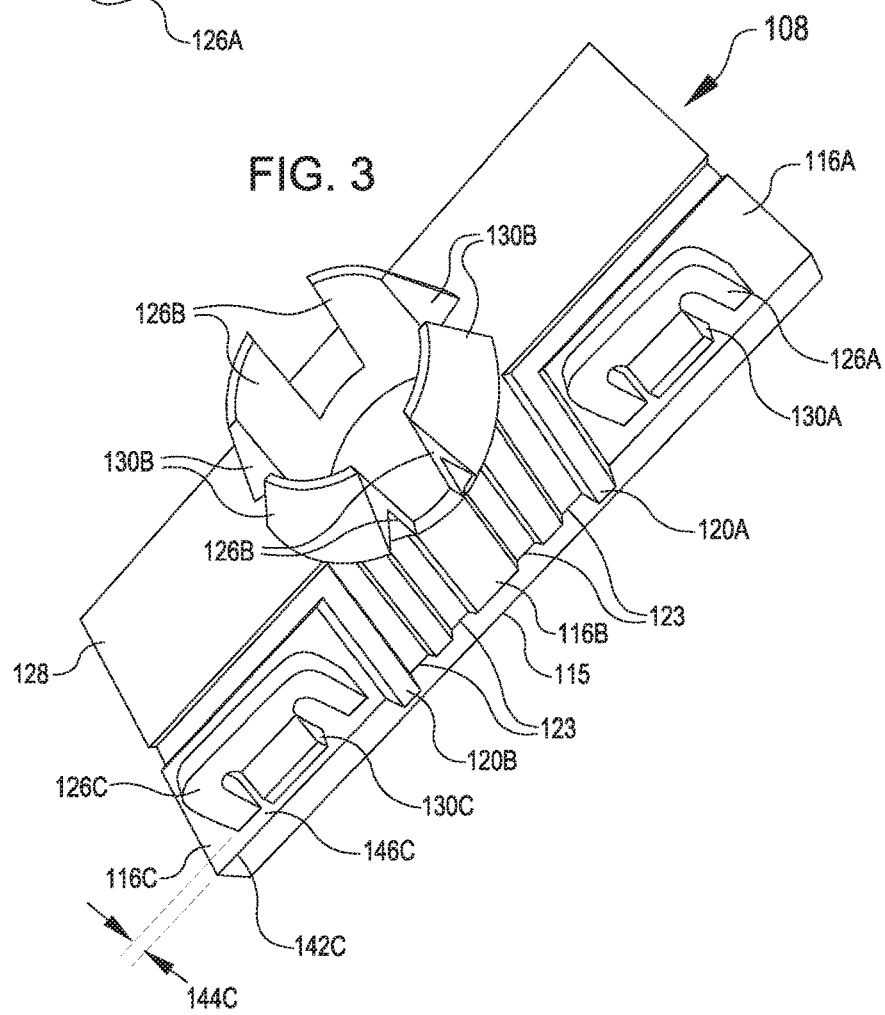

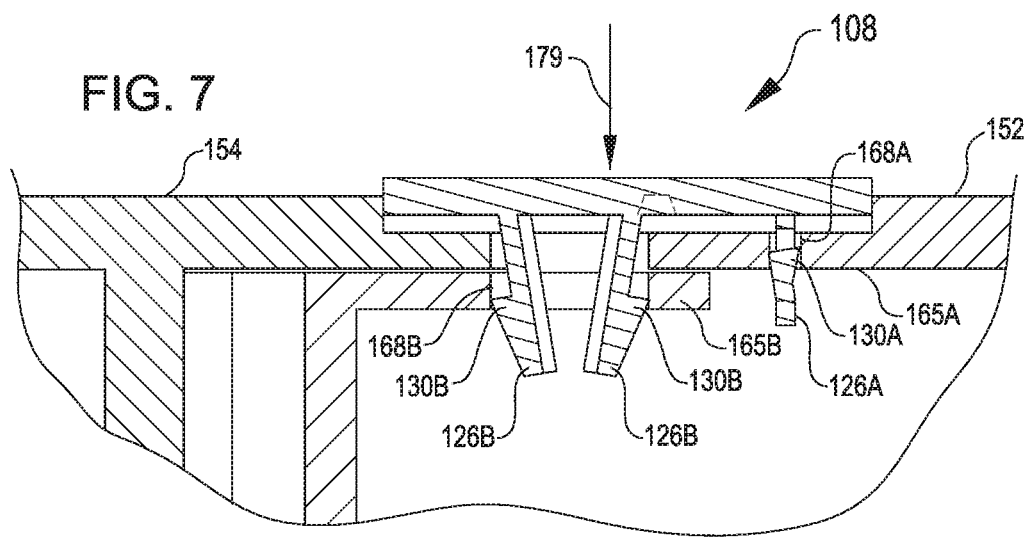
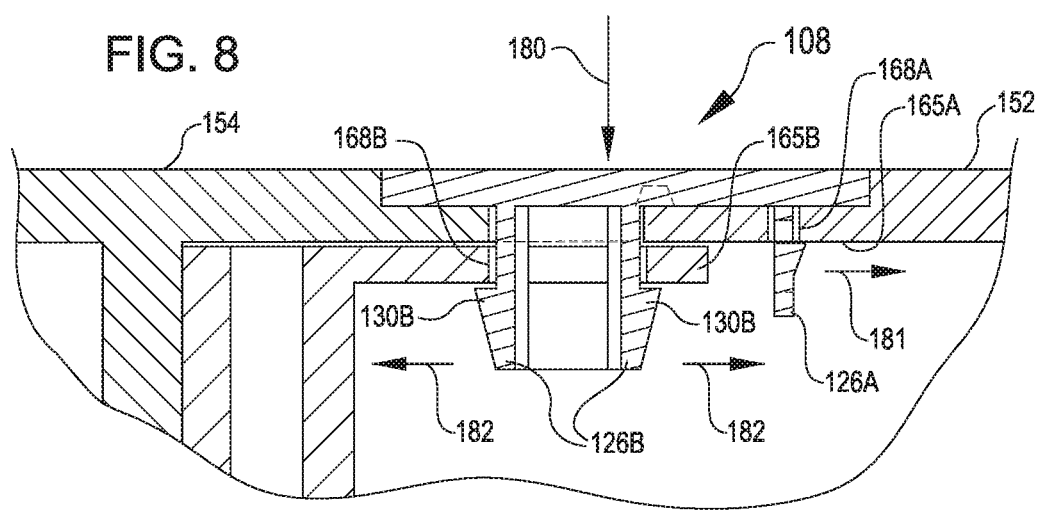

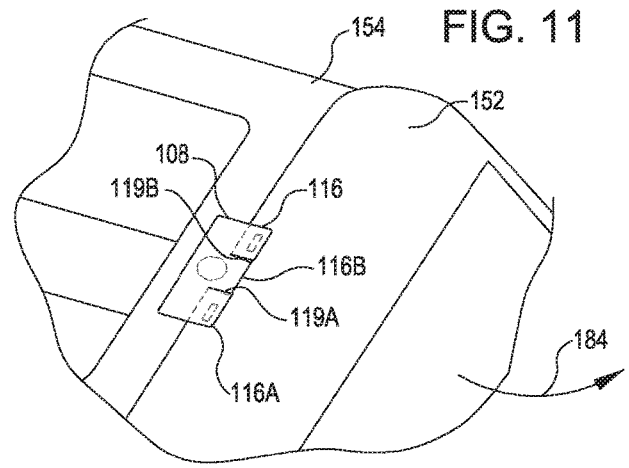
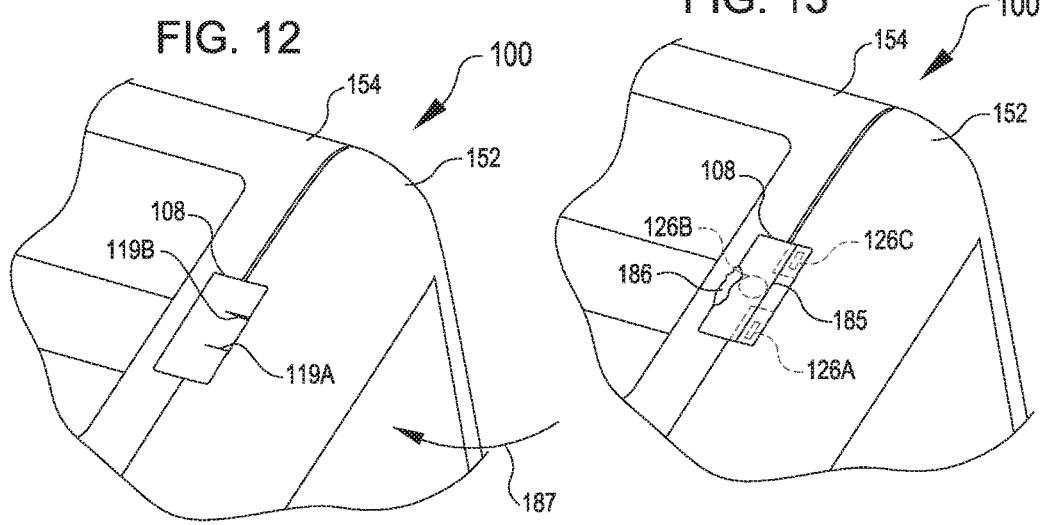
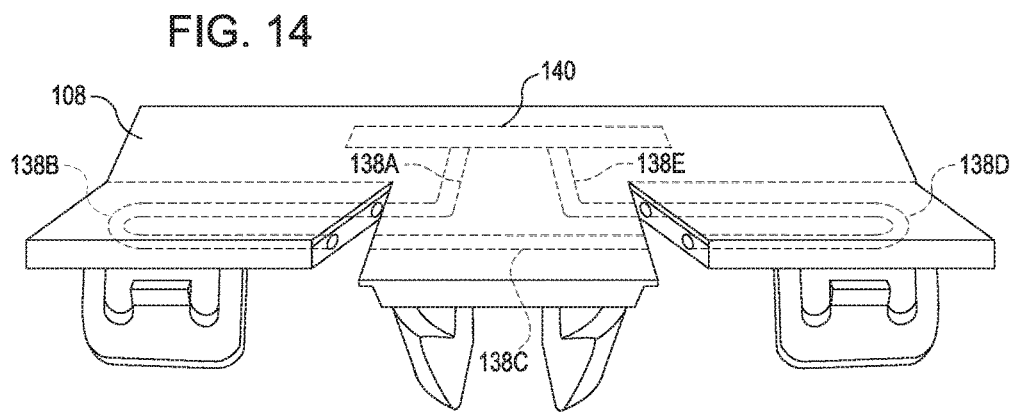

TAMPER-EVIDENT BRACE FOR JUNCTURE OF CASE PIECES

BACKGROUND

Transporting hard drives or other physically discrete storage medium can be an effective way to transfer large amounts of data from one location to another location. In many situations, such hard drives may be entrusted to a courier or other delivery service as a cost-effective way to achieve transfer from place to place. Authorization, security, and/or monitoring features implemented through software components may provide reasonable protection against attempts to digitally access information from such hard drives while in transit. Such software components, however, may lack the ability to detect or indicate whether a hard drive has been physically intercepted for accessing or tampering with hardware components.

BRIEF DESCRIPTION OF THE DRAWINGS

Various embodiments in accordance with the present disclosure will be described with reference to the drawings, in which:

FIG. 1 illustrates a case with pieces that may be coupled together with tamper-evident braces according to certain embodiments;

FIG. 2 illustrates a top perspective view of an example of a brace that may be used with the case of FIG. 1 according to certain embodiments;

FIG. 3 illustrates a bottom perspective view of the brace of FIG. 2 according to certain embodiments;

FIGS. 6-8 illustrate side views showing installation of the brace of FIG. 2 according to certain embodiments;

FIG. 11 illustrates a top perspective view of the deformed state of the brace of FIG. 10 with the case partially open according to certain embodiments;

FIG. 12 illustrates a top perspective view of the deformed state of the brace of FIG. 10 with the case re-closed according to certain embodiments;

FIG. 13 illustrates a top perspective view of the brace of FIG. 2 illustrating other indications of tampering according to certain embodiments;

FIG. 14 illustrates a top perspective view of the brace of FIG. 2 showing damage to circuitry in a deformed state of the brace according to certain embodiments;

DETAILED DESCRIPTION

Figure 4:
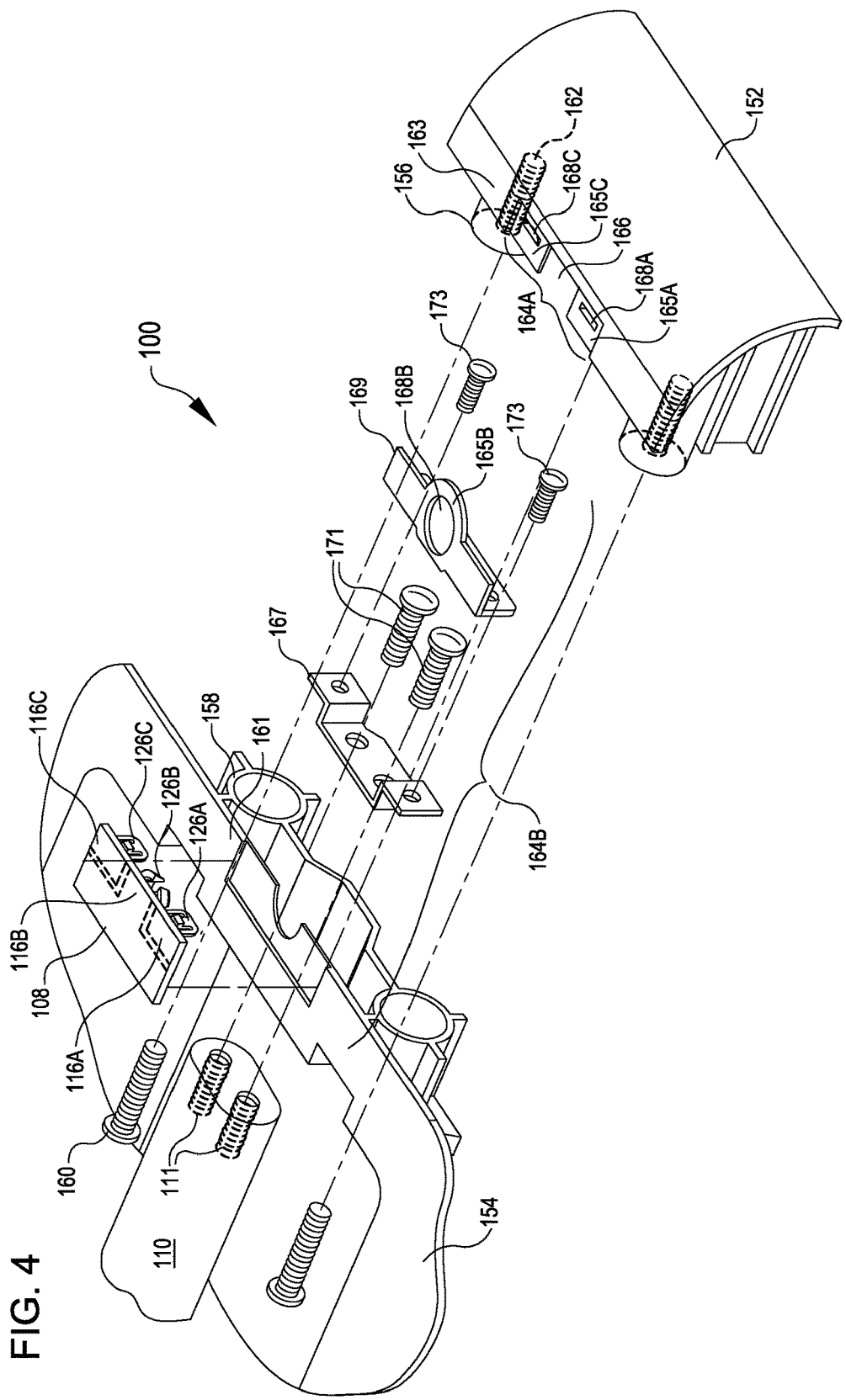
FIG. 4 illustrates an exploded view of the brace of FIG. 2 and elements of a case that may be assembled together according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include use of braces at junctures between case pieces to provide a visual or other indication of potential tampering. In operation, case pieces may be joined together to form a juncture. A brace may be placed over the juncture and connected to the case pieces, which may make it difficult or impossible to separate the case pieces at the juncture without first breaking or removing the brace. The brace can include features that make it difficult to remove the brace from the case pieces without breaking the brace or damaging the brace in some other identifiable way. Accordingly, upon receipt of a case, one or more braces on the case may be inspected (e.g., visually) for damage to the brace. Recognized damage to the brace may provide a visual or other indication that the case may have been tampered with in transit, which may prompt appropriate responsive actions such as opening the case for additional inspection and/or disposing of the case and/or its contents (e.g., based on the conclusion that data stored in physical components of a hard drive in the case is no longer trustworthy due to the evidence of potential tampering). Although techniques described herein may find particular application in providing tamper-evident shipping cases for hard drives or other components for secure transfer of data, the techniques are not so limited and may be applicable in many other scenarios, including, but not limited to, any other scenario in which it may be useful for determining whether contents of a secure case have been made accessible since the case was secured.

In an example embodiment, the brace includes a body formed by a set of three interconnected tabs: a left tab, a middle tab, and a right tab. The three tabs may be interconnected by transition portions, such as portions of the body that form a contiguous surface with the tabs on the top side of the body, yet correspond to grooves on the bottom side of the body that define boundaries between the tabs. The middle tab may be T-shaped, with a stem of the T extending perpendicularly from a middle of a cap of the T. The three tabs may together form a rectangular shape of the body. For example, the left and right tabs may correspond to rectangles positioned on either side of the T-stem and extending vertically to the underside of the T-cap and horizontally to the outer edges of the T-cap.

Continuing with this example embodiment, each tab may include prongs that extend downwardly from the bottom side of the body of the brace. The prongs may include barbs that snap into locking engagement when the prongs are inserted through spaces. Thus, when the brace is installed over a juncture between two joined pieces of a case, the left and right tabs are locked to a first case piece by prongs and barbs inserted through spaces on the first case piece, and similarly, the middle tab is locked to a second case piece by prongs and barbs inserted through spaces on the second case piece.

Such locking engagement may prevent the first case piece and the second case piece from separating until the brace has been dealt with in a manner that will leave physical evidence that the brace has been manipulated since installation. As one example, the brace may be cut to leave the parts of the brace anchored to first case piece and the parts of the brace anchored to the second case piece disconnected from one another in a manner that no longer prevents translating separation of the case pieces from one another at the juncture. However, the cut line in this example may act as visually identifiable feature that indicates that the brace has been sufficiently modified to permit the case pieces to separate since the brace was installed. As another example, pivoting the case pieces relative to one another with the juncture as a hinge line to gain access to the interior of the case may cause a different form of identifiable damage to the brace. In particular, the left and right tabs (e.g., attached to the first case piece) may be constrained to move differently than the middle tab (e.g., attached to the second case piece), which may cause the middle tab to shear apart from the left and right tabs in a visually detectable manner. Additionally or alternatively, an RFID tag or other communication device may be included with circuitry extending through the brace such that cutting or shearing the tabs will cause the RFID tag to present a different signal once the brace has been broken. As a further example, the top side of the brace and/or case pieces may include plastic or other material that may show signs of prying if a screwdriver or other implement was used in an attempt to reach the prongs for disengaging the barbs and removing the brace to separate the case pieces and gain access into the case.

Reference will now be made to the Figures, in which like reference numerals refer to like elements throughout the Figures. In many instances, similar elements may be identified by the same reference numeral and differentiated by a different letter suffix in the Figures. Thus in the following text description, elements may be referenced with suffixes (e.g., for referencing individual or specific elements such as a first access panel 104A or a second access panel 104B) or without suffixes (e.g., for generally or collectively referencing elements such as one or more of the access panels 104).

FIG. 1 illustrates a case 100 formed by a chassis 102 coupled with access panels 104 at respective junctures 106. The case 100 can be reconfigurable between an open configuration (e.g., with one or more of the access panels 104 removed to provide access into an interior of the case 100, such as at a position shown in phantom lines in FIG. 1) and a closed configuration (e.g., with the access panels 104 secured along junctures 106 to obstruct access into the case 100, such as shown in solid lines in FIG. 1). For example, the case 100 may include a hard drive or other memory elements that may be accessible upon transitioning the case 100 from the closed configuration to the open configuration. In some embodiments, the case 100 may include an access feature 109 such as a touch screen interface, a port for wired connection, a locking panel, or some other mechanism that can selectively permit some restricted access to elements protected by the case without exposing the interior of the case to a greater level of access that would be provided in the open configuration (e.g., in the absence of the access panels 104).

The chassis 102 is shown with handles 110 positioned within wells 112. Through-holes 114 are also shown in the wells 112. The through-holes 114 may be utilized for receiving fasteners for securing the access panels 104 along the junctures 106, such as is described in greater detail below with respect to FIG. 4. Other arrangements for securing the access panels 104 along the junctures 106 are also possible though, including, but not limited to through-holes 114 arranged to penetrate the access panels 104 in addition to or in lieu of penetrating the chassis 102.

Braces 108 may be installed along the junctures 106. In an installed position, the braces 108 may span and/or bridge across the junctures 106. Such a position may prevent separation of an access panel 104 from the chassis 102 at a juncture 106 in the absence of the brace 108 being removed or broken. The braces 108 may accordingly function as tamper-evident devices for indicating whether changes have occurred that would permit separation along a juncture 106 for reconfiguring the case 100 from the closed configuration to the open configuration.

FIGS. 2-3 show an example of a brace 108 in greater detail. As shown in FIGS. 2-3, the brace 108 includes a body 115 formed at least in part by at least two tabs 116. In this example, the body 115 is shown with three tabs 116: a first tab 116A, a second tab 116B, and a third tab 116C (which respectively hereinafter may be referenced for easier recognition arranged as a left tab 116A, a middle tab 116B, and a right tab 116C, e.g., consistent with the respective arrangement shown in the view of FIG. 2). The middle tab 116B is shown with a T-shape that includes a T-stem 117 and a T-cap 118. The left tab 116A and right tab 116C are shown nested against the T-stem 117 and the T-cap 118. However, although the T-shape and rectangular shapes are shown, the brace 108 and corresponding tabs 116 may additionally or alternatively include any other suitable form factor.

The tabs 116 are connected to one another by transition portions 119. For example, FIGS. 2-3 show a first transition portion 119A (or segment or region) between and connecting adjacent sides of the left tab 116A and the middle tab 116B and a second transition portion 119B between and connecting adjacent sides of the right tab 116C and the middle tab 116B. The transition portions 119 are shown as portions of the body 115 that are thinner than the tabs 116 due to grooves 120 on a bottom surface 128 (FIG. 3) of the body 115. Such an arrangement may result in the body 115 having a consistent texture across a top surface 134 (FIG. 2) of the body 115 that may be a useful feature for facilitating detection of rips, tears, or other changes in the body 115 through visual inspection. The transition portions 119, however, may correspond to any severable or deformable structure included to define boundaries between the tabs 116. For example, in some embodiments, the transition portions 119 may additionally or alternatively include other grooves, notches, cavities, voids, or tunnels, and such features may be arranged in the top surface 134 of the body 115, within the body 115, and/or on the bottom surface 128 of the body 115 in any suitable pattern (e.g., forming a dashed line similar to perforation patterns, a continuous line, or other pre-determined arrangement for guiding rips, tears, or other changes in the body 115).

With reference to FIG. 2, the transition portions 119 are each shown include a bending portion 121 and a breaking portion 122. The bending portions 121 are shown arranged along the T-cap 118, and the breaking portions 122 are shown arranged along the T-stem 117. In one example, in use, independently rotating the left tab 116A may cause breaking in the breaking portion 122A (e.g., severing the left tab 116A from the T-stem 117) and bending in the bending portion 121A (e.g., rotating the left tab 116A toward or away from the T-cap 118). In some embodiments, the brace 108 may include ribs 123 or other features that may provide additional rigidity or otherwise reinforce the middle tab 116B, for example, to reduce a risk that the middle tab 116B may flex or break when the shearing is occurring along the breaking portions 122.

Referring to FIG. 3, prongs 126 are shown extending from a bottom surface 128 of the brace 108. For example, the left tab 116A is shown with prong 126A, the right tab 116C is shown with prong 126C, and the middle tab 116B is shown with prongs 126B. Although the prongs 126A and 126C are each depicted as a single flange and the prongs 126B are depicted as a series of four circularly-arranged teeth, any number or arrangement of the prongs 126 may be utilized for engaging the brace 108 into locking engagement along a juncture 106 (FIG. 1).

The prongs 126 may include respective barbs 130. The barbs 130 may include tapered surfaces and flexible, resilient material to permit the barbs to deflect during insertion and also to return toward an original orientation to snap into place. In some embodiments, the prongs 126 may be positioned on the body 115 of the brace 108 in an arrangement that obstructs access to the prongs 126 when the brace 108 is in an installed positon. For example, the prong 126C is depicted in FIG. 3 as offset from an edge 142C of the brace 108 (for example, by an offset distance 144C), which may form a ledge 146C or overhang by the prong 126C that may reduce an ease with which the prong 126C may be accessed after the brace 108 has been installed.

The ledge 146C is one example of how the barbs 130 may be arranged to prevent removing the brace 108 from locking engagement with the case 100 in the absence of rupturing the case 100 or inflicting other tamper-evident damage to the brace 108 or case 100. Once the case 100 has been opened, in various embodiments, the barbs 130 may be readily reached for manipulation from within the exposed interior of the case 100 to allow the barbs to flex and facilitate respective removal of the prongs 126. Removing the prongs 126 from the case 100 may allow a new brace 108 to be installed, e.g., according to the installation process shown in FIGS. 7-9 after the case 100 has been closed anew.

FIG. 4 illustrates an exploded view of the brace 108 and elements of the case 100. A first case piece 152 and a second case piece 154 are shown in FIG. 4, and may respectively correspond to the access panel 104A and the chassis 102 of FIG. 1, for example. In some embodiments, however, features may be reversed or otherwise arranged, e.g., features depicted as appearing on the chassis 102 may instead appear on the access panel 104 or vice versa.

As depicted, the first case piece 152 shown in FIG. 4 includes bosses 156 that may be received in collars 158 of the second case piece 154, for example, to join the first case piece 152 and the second case piece 154 together (e.g., to form a juncture 106 of FIG. 1). Fasteners 160 may be inserted through the collars 158 (e.g., through the through-holes 114 of FIG. 1) to secure the first case piece 152 and the second case piece 154 together, such as by engagement with the bosses 156 at interior surfaces 162 that are threaded or otherwise configured to receive and/or engage the fastener 160.

The first case piece 152 and the second case piece 154 shown in FIG. 4 each include respective interfaces 164. The interfaces may be adjacent the juncture 106 when the case 100 is closed. In some embodiments, the interfaces may be along respective rims 163 of the pieces of the case 100. The interfaces 164 include features for receiving the brace 108 in a position spanning across the juncture formed from the case pieces 152 and 154 being joined together. In some aspects, the interfaces 164 may include portions that are at least partially inset from a top surface 161 of the case 100, e.g., so that the brace 108 in an installed position sits flush with the case 100.

Anchor segments 165 may be included in the interfaces 164 for anchoring respective tabs 116 of the brace 108. For example, the anchor segments 165 may include spaces 168 for receiving prongs 126 extending from tabs 116. Other methods of anchoring are also possible, including, but not limited to, arrangements in which prongs 126 instead extend from the anchor segments 165 and corresponding receiving spaces 168 are situated in the tabs 116.

In the arrangement depicted in FIG. 4, the interface 164A of the first case piece 152 is shown having a gap 166 defined between a left anchor segment 165A and a right anchor segment 165C. The left anchor segment 165A is depicted with a space 168A that may receive the prong 126A from the left tab 116A, for example, to anchor the left tab 116A to the first case piece 152. Similarly, the right anchor segment 165C is depicted with a space 168C that may receive the prong 126C from the right tab 116C, for example, to anchor the right tab 116C to the first case piece 152. The gap 166 may be sized to accommodate receiving at least a portion of the middle tab 116B (e.g., for receiving a part of the T-stem 117 referenced in FIG. 2). Such sizing may facilitate functionality described in greater detail in FIG. 10.

Figure 6:
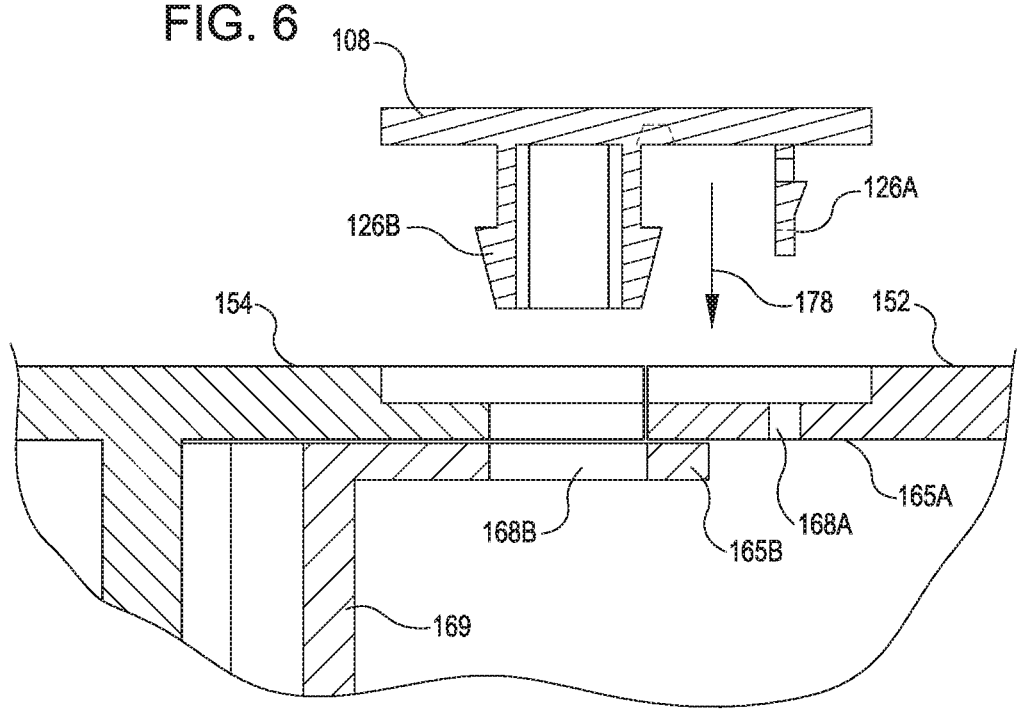

The interface 164B of the second case piece 154 is shown in FIG. 4 having various elements that together anchor at least a portion of the middle tab 116B to the second case piece 154. In the example depicted in FIG. 4, the interface 164B includes a spacer 167 and a bracket 169. Fasteners 171 are also shown for securing the spacer 167 to the second case piece 154. For example, the fasteners 171 may engage the handle 110, such as by engagement with interior surfaces 111 that are threaded or otherwise configured to receive and/or engage the fasteners 171. Additional fasteners 173 are shown for securing the bracket 169 to the spacer 167. The bracket 169 as depicted acts as a middle anchor segment 165B for securing the middle tab 116B to the second case piece 154. For example, the bracket 169 may be attached to the second case piece 154 (e.g., via spacer 167) and can include a space 168B for receiving prongs 126B from the middle tab 116B. In some embodiments, e.g., as shown in FIG. 6, when the first case piece 152 and the second case piece 154 are connected (e.g., when the case 100 is closed), the bracket 169 may be arranged at least partially extending underneath the gap 166 in the first case piece 152.

In some embodiments, the bracket 169 may be formed of a stronger and/or stiffer material than a material from which the second case piece 154 is formed. For example, if the second case piece 154 is made of plastic, the bracket 169 may be made of metal. Greater strength and/or stiffness in the bracket 169 than in the second case piece 154 may in certain embodiments reduce a degree of flexibility that might otherwise impede the functionality described in greater detail in FIG. 10.

In some embodiments, the spacer 167 may provide an appropriate geometry for mounting the bracket 169 for obtaining an appropriate interface 164B, for example, in situations in which an existing second case piece 154 otherwise lacks a suitable surface for directly mounting the bracket 169. Other arrangements for the interface 164B are also possible, including, but not limited to arrangements in which the spacer 167 is omitted and/or arrangements in which the bracket 169 is integrated into the spacer 167 and/or the second case piece 154.

Figure 5:
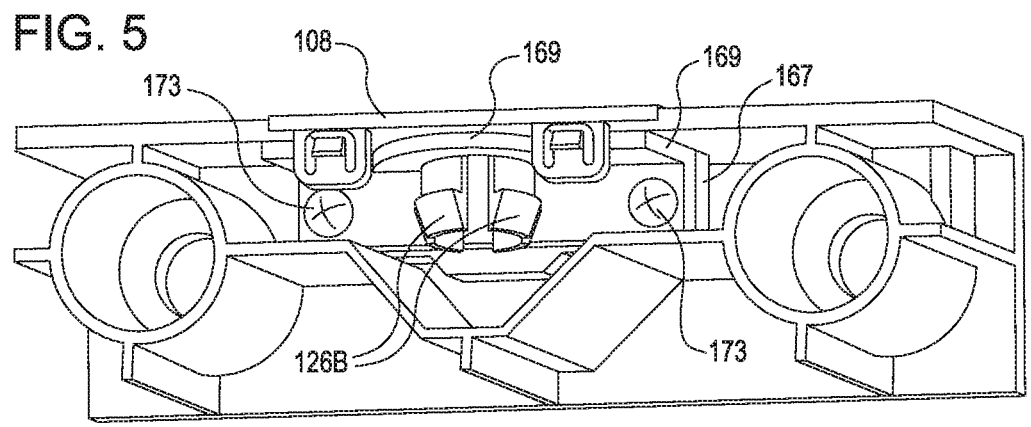
FIG. 5 illustrates a perspective view of the brace installed in one element of the case of FIG. 4 in the absence of another element of the case according to certain embodiments.

FIG. 5 illustrates a perspective view of the brace 108 installed in the second case piece 154 in the absence of the first case piece 152. In contrast to FIG. 4, in the arrangement shown in FIG. 5, the spacer 167 and bracket 169 have been secured to the second case piece 154 (e.g., via at least fasteners 173 visible in FIG. 5), and the prong 126B has been received into the bracket 169.

FIGS. 6-8 illustrate side views showing an example installation of the brace 108. With reference to FIG. 6, the brace 108 may be aligned over the juncture 106 of the first case piece 152 and the second case piece 154. The brace 108 may be lowered (e.g., as illustrated by arrow 178) so that the prongs 126 are lowered toward the spaces 168. For example, this may include moving the prong 126A on the left tab 116A toward the space 168A associated with the first case piece 152 (e.g., in the left anchoring segment 165A) and may include moving the prongs 126B on the middle tab 116B toward the space 168B associated with the second case piece 154 (e.g., in the middle anchoring segment 165B, shown formed at least in part by the bracket 169 in FIG. 6). This may also cause at least a part of the middle tab 116B to be aligned at least partially extending over the gap 166 (FIG. 4) formed in the first case piece 152, e.g., between the left anchoring segment 165A and the right anchoring segment 165B shown in FIG. 4.

With reference to FIG. 7, lowering (e.g., as illustrated by arrow 179) the prong 126A on the left tab 116A into the space 168A associated with the first case piece 152 (e.g., in the left anchoring segment 165A) may cause the barb 130A to contact an edge of the space 168A and flex so as to shift into a deflected state while passing into the space 168A. A similar effect may occur to the barbs 130B on the prongs 126B on the middle tab 116B while passing into the space 168B associated with the second case piece 154 (e.g., in the middle anchoring segment 165B).

With reference to FIG. 8, further travel (e.g., as illustrated by arrow 180) of the prong 126A on the left tab 116A into the space 168A in the first case piece 152 (e.g., in the left anchoring segment 165A) may permit the barb 130A to pass the deflection-inducing edge of the space 168A and move out of a flexing or deflected state (e.g., as illustrated by arrow 181), such as to snap into locking engagement with an interior of the first case piece 152. A similar effect (e.g., as illustrated by arrows 182) may occur to the barbs 130B on the prongs 126B on the middle tab 116B upon further travel through the space 168B associated with the second case piece 154 (e.g., in the middle anchoring segment 165B).

Figure 9:
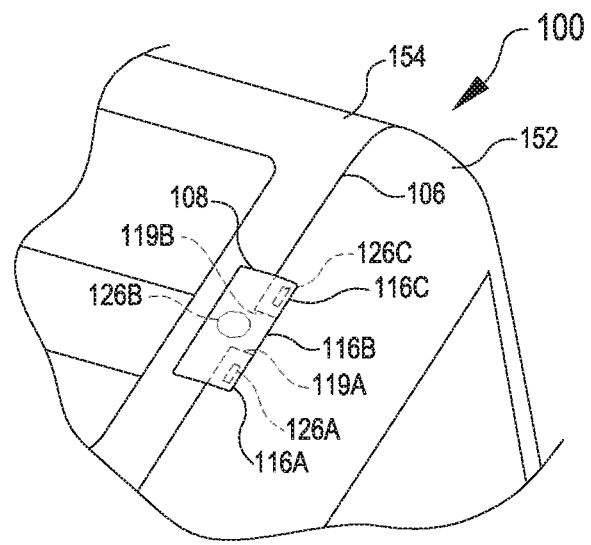
FIG. 9 illustrates a top perspective view of the brace of FIG. 2 in an installed position according to certain embodiments.

FIG. 9 illustrates a top perspective view of the brace 108 in an installed position in the case 100. For example, the brace 108 may reach the position shown in FIG. 9 by undergoing an installation process as shown in FIGS. 7-8. In the installed position, the brace 108 may prevent the first case piece 152 and the second case piece 154 from separating from one another along the juncture 106 without first damaging the brace 108 in a tamper-evident fashion. The brace 108 may prevent such separation by connecting the first case piece 152 and the second case piece 154 to each other. For example, in the installed position shown in FIG. 9, the first case piece 152 is connected by the prongs 126A and 126C to the left tab 116A and to the right tab 116C, which are connected through the transition portions 119A and 119B to the middle tab 116B, which is connected by the prongs 126B to the second case piece 154. In various embodiments, the brace 108 may prevent the first case piece 152 and the second case piece 154 from separating from one another along the juncture 106 regardless of whether the fasteners 160 (FIG. 4) have been removed from the case 100.

Figure 10:
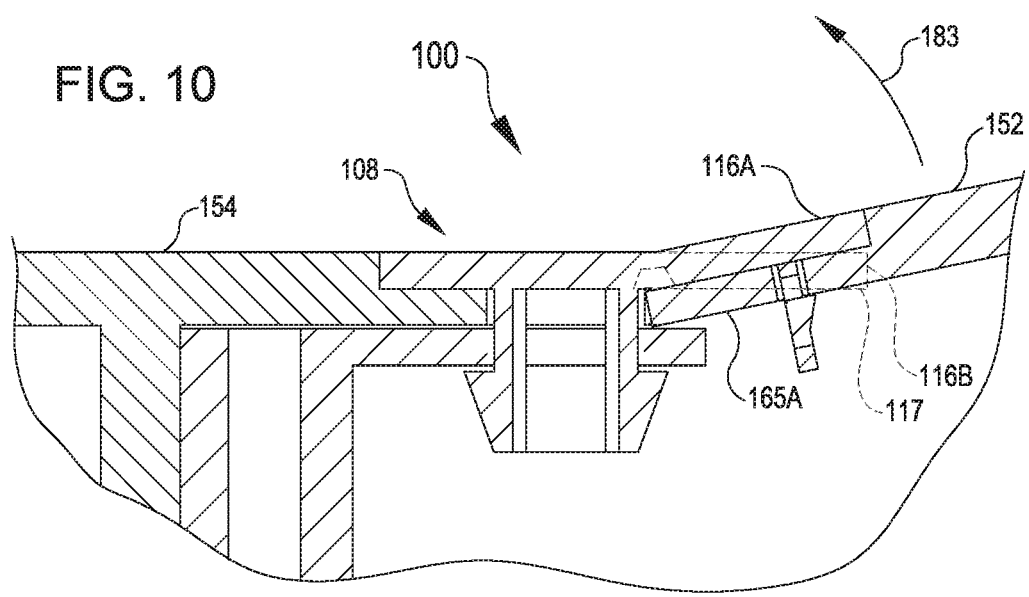
FIG. 10 illustrates a side view of the brace of FIG. 2 in a deformed state resulting from at least partially opening the case according to certain embodiments.

FIG. 10 illustrates a side view of the brace 108 in a deformed state that may provide a tamper-evident indication that the case 100 has been opened in a particular fashion. In particular, the case 100 may be at least partially opened by rotating the first case piece 152 relative to the second case piece 154, such as illustrated by the arrow 183 in FIG. 10. This may include exerting force on the first case piece 152 to cause rotation while the second case piece 154 remains stationary, exerting a force on the second case piece 154 to cause rotation while the first case piece 152 remains stationary, or any other combination of force exertion that causes a relative rotation between the first case piece 152 and the second case piece 154.

Rotating the first case piece 152 relative to the second case piece 154 may cause the tabs 116 of the brace 108 to move relative to one another, for example, due to the tabs 116 being acted upon differently by the first case piece 152 and the second case piece 154. For example, the middle tab 116B may match the movement (or lack thereof) of the second case piece 154 (e.g., due to being anchored to the second case piece 154). Thus, the first case piece 152 may move relative to the middle tab 116B. For example, movement of the first case piece 152 (e.g., as illustrated by arrow 183) may move the gap 166 (FIG. 4) to move about the middle tab 116B such that the gap 166 receives at least a portion of the middle tab 116B (e.g., a portion of the T-stem 117 of FIG. 2). Additionally, the left tab 116A and the right tab 116C may move with the first case piece 152 (e.g., due to being anchored to the first case piece 152 and/or due to being pushed by solid and interfering portions of the first case piece 152, such as the anchor segments 165A and 165C). Thus, the left tab 116A and the right tab 116C may move away from the middle tab 116B.

Referring to FIG. 11, the left tab 116A and the right tab 116C moving away from the middle tab 116B (e.g., in response to rotating the first case piece 152 relative to the second case piece 154, such as illustrated by the arrow 184 in FIG. 11) may cause rupturing or deformation along the transition portions 119A and 119B.

Referring to FIG. 12, such rupturing or deformation along the transition portions 119A and 119B may be permanent and remain even after the case 100 has been re-closed (e.g., even after the first case piece 152 is rotated back toward the second case piece 154, such as illustrated by the arrow 187 in FIG. 12). Such rupturing or deformation along the transition portions 119A and 119B may accordingly serve as a visually-detectible tamper-evident indication that the case 100 has been opened since the brace 108 was installed.

Referring to FIG. 13, other tamper-evident indications may additionally or alternatively be provided by the brace 108. In some situations, the brace 108 may be cut along the juncture 106 to separate the brace 108 into distinct portions and allow the first case piece 152 and the second case piece 154 to be translated apart from one another. A resulting cutline 185 in such situations may be a visually detectible tamper-evident indication. The cutline 185, for example, may separate prongs 126A and 126C that are received in the first case piece 152 from prongs 126B that are received in the second case piece 154. Additionally or alternatively, the case 100 and/or the brace 108 may show gouges 186 or other areas of deformation where a tool or other implement may have been used in an attempt to access prongs 126 and/or barbs 130 of the brace 108 to pry the brace 108 free.

Thus, in an illustrative example, if a brace 108 is at least partially broken or shows some other evidence of tampering, the brace 108 may be completely broken or ruptured (e.g., by an operator) to permit inspection of the contents of the case 100. Further, a new brace 108 may be installed following the inspection to provide a new tamper-evident indicator for subsequent use of the case 100. For example, the new brace 108 may function to provide an indication that the brace 108 since being placed in the installed position has undergone a change that facilitates separation of the first case piece 152 from the second case piece 154 along the juncture 106 for reconfiguring the case 106 from the closed configuration to the open configuration.

Turning to FIG. 14, in some embodiments, other features may additionally or alternatively be included to supplement or replace visual inspection techniques for detecting tamper-evident indicators provided by the brace 108. In FIG. 14, the brace 108 includes electronic components that may be utilized for detecting tampering. The brace 108 may include circuitry 138, for example, for a radio frequency identification (RFID) tag 140. The circuitry 138 may extend through at least some of the tabs 116. For example, the circuitry 138 is shown in FIG. 14 extending from the RFID tag 140 on the middle tab 116B (e.g., at 138A), onto the left tab 116A (e.g., at 138B), back onto the middle tab 116B (e.g., at 138C), onto the right tab 116C (e.g., at 138D), and back again onto the middle tab 116B (e.g., at 138E) to return to the RFID tag 140. Such an arrangement may cause the RFID tag to be detectable in a first broadcast condition (e.g., transmitting at a particular frequency) when the tabs 116 have not yet been broken, and also cause the RFID tag to be detectable in a different, second broadcast condition (e.g., transmitting at a second, different particular frequency or not capable of broadcasting at all, which may result in a "no-broadcast" condition being detected) when the tabs 116 have been broken (e.g., along the transition portions 119 referenced in FIG. 2).

The circuitry 138 is not limited to the arrangement depicted however. For example, the circuitry may be routed otherwise through the tabs 116 (e.g., including through fewer than all of the tabs 116) or in some other fashion that causes a detectable change in the circuitry 138 at least temporarily during breakage of the brace 108. In some aspects, the circuitry 138 may be associated with other wireless near field communication technology or other components instead of an RFID tag 140. For example, the circuitry 138 may include electrical leads or other connections that may be accessed to determine if the circuitry 138 has undergone changes in resistance or other criteria that may be indicative of the brace 108 having been broken or at least temporarily changed.

Figure 15:
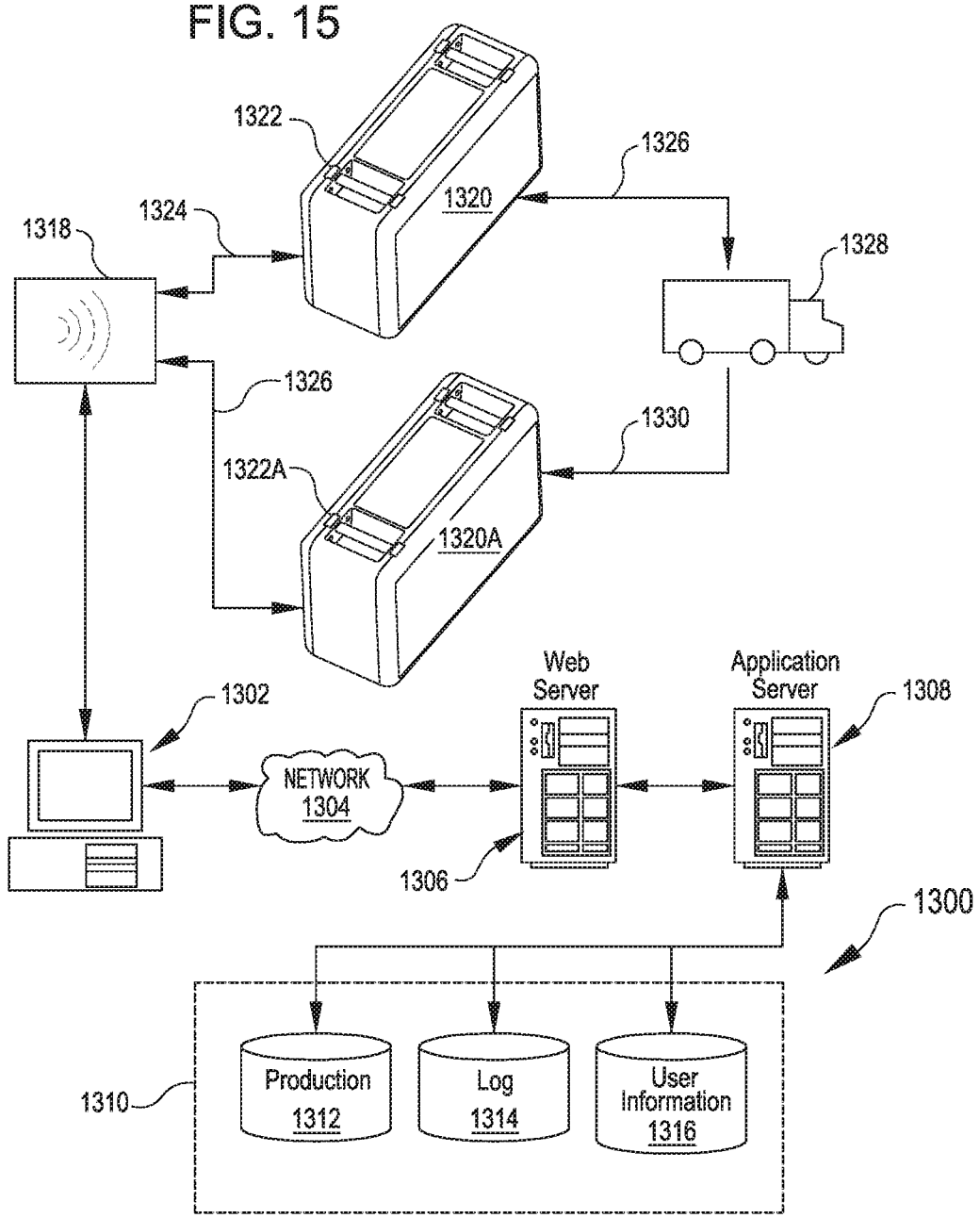
FIG. 15 illustrates a system for implementing various techniques described according to certain embodiments.

FIG. 15 illustrates a system 1300 that may be utilized for automated detection of tampering-evident indications. The system 1300 includes an electronic client device 1302 and a sensor 1318. As will be described in greater detail following the description of FIGS. 16-17, FIG. 15 also illustrates other elements of an example environment 1300 for implementing aspects in accordance with various embodiments.

The sensor 1318 can include any suitable components for reading and/or detecting components of a case 1320 (which may be an example of the case 100 described elsewhere herein). Examples of suitable components may include RFID readers, optical readers (e.g., for reading barcodes), or other sensors capable of receiving identifying information from the case 1320 or components associated with the case 1320, such as a brace 1324 (which may be an example of the brace 108 described elsewhere herein). The sensor 1318 may communicate with the client device 1302, for example, to receive commands for implementing detecting techniques or to send information received from detection.

A detection (e.g., at 1324) by the sensor 1318 may provide information that the client device 1302 may use to associate the case 1320 with a particular brace 1322. As an illustrative example, the sensor 1318 may detect an RFID tag in the brace 1324, for example, which may correspond to an RFID tag 140 and associated circuitry 138 described with respect to FIG. 14. This detection may provide information indicative of a first unique identifier. The sensor may also read a barcode or serial number from the case 1320 to provide information indicative of a second unique identifier. The client device 1302 may generate a record associating the first unique identifier with the second unique identifier for associating the specific brace 1324 with the case 1320.

Custody of the case 1320 may be transferred at 1326. For example, the case 1320 may be provided to a shipping service provider 1328 for delivery to a customer.

At 1330, custody may be reestablished. For example, the case and associated brace (respectively designated 1320A and 1322A to differentiate from the state previously discussed) may be returned by the same or a different shipping service provider 1328 from the customer. The sensor 1318 may obtain information about the case 1320A and/or the brace 1322A. The client device 1302 may use the information to identify the case 1320A based on the previously generated record. If the client device 1302 identifies that the brace 1322A is broadcasting the same first unique identifier registered in the record, this may indicate that no tampering has occurred. If a different unique identifier from the brace 1322A is detected, this may indicate that a counterfeit brace 1322A has been substituted, thus indicating tampering. A different response from the brace 1322A (which may include a non-response such as a "no broadcast" condition detected by the sensor 1318) may additionally or alternatively indicate that the brace 1322A underwent some tampering that caused a physical distortion sufficient to affect the RFID tag circuitry.

Figure 16:
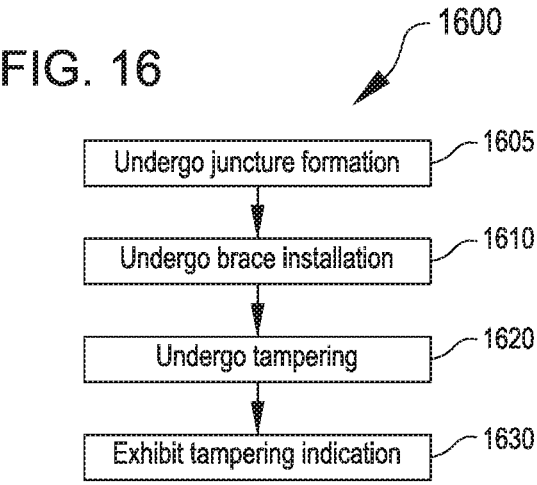
FIG. 16 is a flow chart illustrating a process that may be performed by a tamper-proof assembly including the brace of FIG. 2 according to certain embodiments.

FIG. 16 is a flowchart illustrating a process 1600 which may be performed by a tamper-evident assembly, such as the case 100 and brace 108 described herein. At 1605 the process 1600 can include undergoing formation of a juncture. For example, this may correspond to the first case piece 152 and the second case piece 154 being releasably joined together, such as by being translated relative one another to form the juncture 106. In some embodiments, the formation of the juncture may enclose an internal volume of the case. In some embodiments, the formation of the juncture may enclose a hard drive or other electronic storage device within the internal volume of the case.

At 1610, the process 1600 can include undergoing installation of a brace. Installation of the brace may include any of the operations described with respect to FIGS. 6-8. For example, installation of the brace may correspond to the brace 108 being installed in the first case piece 152 and the second case piece 154. The brace 108 may be installed relative to the juncture 106 formed by the first case piece 152 and the second case piece 154, for example being installed across and/or straddling the juncture 106. The brace 108 may be installed in an initial known configuration, for example, such that the brace 108 when received in a subsequent condition can be compared to the initial known configuration to determine if tampering has occurred in the interim. The initial known configuration, for example, may correspond to a condition in which tabs 116 are not yet sheared apart or otherwise broken. As another example, the initial known configuration may correspond to a brace 108 including electronic circuitry (e.g., RFID or otherwise) in a known first detectable condition.

At 1620, the process 1600 can include undergoing tampering, and at 1630, the process 1600 can include exhibiting an indication of tampering on or along a brace. In various embodiments, the indication of tampering exhibited at 1630 may depend on a type of tampering undergone at 1620. Some examples of different types of tampering and exhibited tampering indications have been described by way of example with respect to FIGS. 10-15.

As one example, the process 1600 at 1620 may correspond to the case 100 being at least partially opened by rotating the first case piece 152 relative to the second case piece 154, and the process at 1630 may correspondingly include the brace 108 shearing or otherwise breaking along tabs 116 to exhibit tampering. As an illustrative example, the process 1600 at 1620 may include undergoing rotating of the first case piece relative to the second case piece about the juncture and toward the brace. Additionally, in response to the rotating of the first case piece relative to the second case piece about the juncture and toward the brace, various responses may occur. For example, these may include receiving the second tab in the gap of the first case piece and pushing the first tab by the first case piece into relative movement away from the second tab received in the gap of the first case piece. In response to the relative movement of the first tab away from the second tab, the brace may undergo rupture or deformation along the transition portion. The brace may also exhibit a tamper-evident indication that the first case piece and the second case piece have been rotated relative one another since the brace was installed on the case (e.g., the tamper-evident indication may include or be the rupture or deformation along the transition portion).

As another example, the process 1600 at 1620 may correspond to the brace 108 being subjected to cutting, such as to separate parts of the brace 108 anchored to the first case piece 152 from parts of the brace anchored to the second case piece 154. At 1630, the brace 108 may accordingly exhibit a cutline as an indication of tampering.

As a further example, the process 1600 at 1620 may correspond to the brace 108 being subjected to prying, such as in an effort to dislodge prongs 126 anchoring the brace 108 along the juncture 106. At 1630, the brace 108 may accordingly exhibit a gouges or other areas of deformation left on the brace 108 and/or case 100 from usage of a tool or other implement as an indication of tampering.

Figure 17:
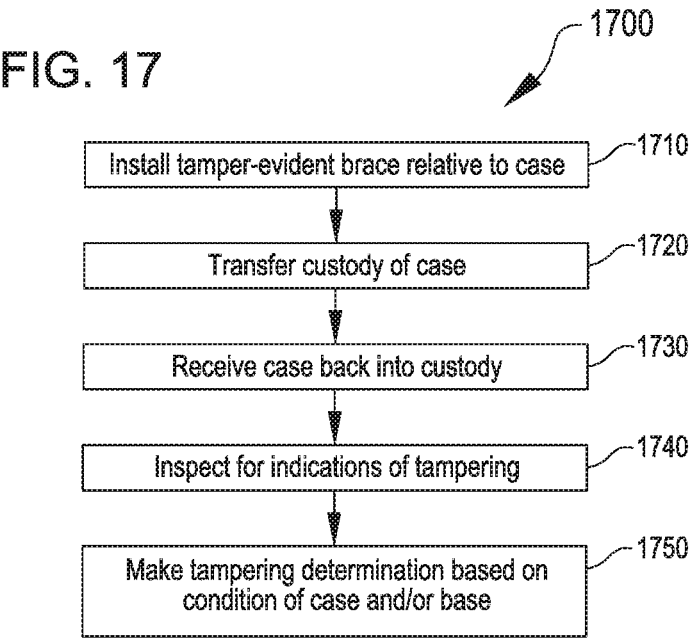
FIG. 17 is a flow chart illustrating a process that may be performed by a service provider with respect to the brace of FIG. 2 according to certain embodiments.

FIG. 17 is a flowchart illustrating a process 1700 which may be performed using the case 100. For example, the process 1700 may be performed by a service provider interested in obtaining indications of tampering of the case 100.

At 1710, the process 1700 can include installing a tamper-evident brace on a case. The process at 1710 may include any actions described elsewhere herein. For example, the process 1700 may include actions described above with respect to FIGS. 4-8 and/or actions described with respect to 1605 of the process 1600.

At 1720, the process 1700 can include transferring custody of the case. For example, this may correspond to providing the case 1320 to a shipping services provider as described at 1326 in FIG. 15.

At 1730, the process 1700 can include receiving the case back into custody of the case. For example, this may correspond to receiving the case 1320 from the same or another shipping services provider as described at 1330 in FIG. 15.

At 1740, the process 1700 can include inspecting for indications of tampering. In some embodiments, this may include visually inspecting the case for indications described in FIGS. 11-12, such as cutlines 185, gouges 186, and/or transition portions 119 exhibiting rupturing or deformation. In some embodiments, this may include electronically inspecting the case for tamper-evident indications, such as by using a sensor 1318 for detecting electronic changes to circuitry 138 or other electronic components since the installation of the brace at 1710. In some embodiments, the inspection may include both visual and electronic inspection. In some embodiments, the inspecting at 1740 may include inspecting the brace 108 for breakage along a transition portion 119 for a tamper-evident indication that the assembly including the case 100 and the brace 108 has undergone certain actions, for example, actions including those described above with respect 1620 of process 1600.

At 1750, the process 1700 can include making a tampering determination based on the condition of the case and/or brace. For example, this may include determining that tampering occurred since installation of the brace based on the presence of tamper-evident indications, which may include cutlines 185, gouges 186, transition portions 119 exhibiting rupturing or deformation, electronically detected tampering indications, and/or any other indications detected at 1740.

As noted previously, FIG. 15 also illustrates aspects of an example environment 1300 for implementing aspects in accordance with various embodiments. As will be appreciated, although a Web-based environment is used for purposes of explanation, different environments may be used, as appropriate, to implement various embodiments. The environment includes the electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A tamper-evident assembly, comprising:
a case comprising a first case piece and a second case piece configurable between a closed configuration and an open configuration, the first case piece and the second case piece in the closed configuration releasably joined together so as to define a juncture between the first case piece and the second case piece, the first case piece and the second case piece in the open configuration at least partially separated from one another so as to provide access to an interior of the case;
a first interface included on the first case piece and adjacent the juncture in the closed configuration, the first interface comprising a left anchor segment and a right anchor segment defining a gap between the left anchor segment and the right anchor segment;
a second interface included on the second case piece and adjacent the juncture in the closed configuration, the second interface comprising a middle anchor segment; and
a brace configured to straddle the juncture in an installed position on the case in the closed configuration, the brace comprising a body, the body comprising a left tab, a middle tab, a right tab, a first transition portion between and connecting adjacent sides of the left tab and the middle tab, and a second transition portion between and connecting adjacent sides of the right tab and the middle tab, the brace in the installed position arranged such that:
the left tab is anchored to the first case piece in the left anchor segment;
the right tab is anchored to the first case piece in the right anchor segment; and the middle tab is anchored to the second case piece in the middle anchor segment and arranged at least partially extending over the gap defined between the left anchor segment and the right anchor segment such that rotation of the first case piece relative to the second case piece along the juncture causes the middle tab to be received in the gap while the left and right tabs move relative to the middle tab, thereby causing deformation or rupturing along the first transition portion and the second transition portion so as to provide a tamper-evident indication of the case having been opened by rotation for access to the interior of the case since the brace was installed on the case.

2. The tamper-evident assembly of claim 1, wherein the brace in the installed position is arranged such that:
   the left tab of the brace is anchored to the first case piece in the left anchor segment by a prong of the left tab being in locking engagement with a space in the left anchor segment;
   the right tab of the brace is anchored to the first case piece in the right anchor segment by a prong of the right tab being in locking engagement with a space in the right anchor segment; and
   wherein the prongs on the left tab and the right tab are arranged to be inaccessible for disengaging the locking engagement in the closed configuration of the case and arranged to be accessible for disengaging the locking engagement in the open configuration of the case.

3. The tamper-evident assembly of claim 1, wherein the second interface includes a bracket arranged in the closed configuration at least partially extending underneath the gap defined between the left anchor segment and the right anchor segment.

4. The tamper-evident assembly of claim 1, wherein the brace further comprises a radio frequency identification (RFID) tag having circuitry extending through at least one of the first transition portion or the second transition portion such that the RFID tag is detectable in a different broadcast condition when the at least one of the first transition portion or the second transition portion have undergone the deformation or rupturing than a broadcast condition detectable when the at least one of the first transition portion or the second transition portion have not yet undergone the deformation or rupturing.

5. A tamper-evident assembly comprising:
   a first case piece comprising a rim and a gap defined along the rim;
   a second case piece releasably joined with the first case piece along the rim so as to define a juncture between the first case piece and the second case piece; and
   a brace comprising a first tab and a second tab connected by a transition portion, the brace straddling the juncture such that the first tab is attached with the first case piece and such that the second tab is attached with the second case piece and adjacent the gap in the first case piece, the brace straddling the juncture further comprising the brace being arranged such that rotating the first case piece relative the second case piece and into the brace will cause the second tab to be received in the gap of the first case piece, the first tab to be pushed by the first case piece and to undergo relative movement away from the second tab received in the gap of the first case piece, and the transition portion to undergo rupturing or deformation in response to the relative movement of the first tab away from the second tab.

6. The assembly of claim 5, wherein the second tab comprises a prong that extends into a space so as to anchor the second tab to the second case piece.

7. The assembly of claim 6, wherein the space is positioned in a bracket that is anchored to the second case piece and that is arranged at least partially extending underneath the gap in the first case piece when the second case piece is releasably joined with the first case piece.

8. The assembly of claim 7, wherein the bracket is formed of a material that is at least one of stiffer or stronger than a material forming the second case piece.

9. The assembly of claim 5, wherein the first tab comprises a prong that extends into a space so as to anchor the first tab to the first case piece.

10. The assembly of claim 5, wherein the rupturing or deformation of the transition portion is visually detectable.

11. The assembly of claim 10, wherein the rupturing or deformation of the transition portion is electrically detectable.

12. The assembly of claim 5, further comprising a near field communication component having circuitry extending through the transition portion such that the near field communication component is detectable in a different broadcast condition when the transition portion has undergone the deformation or rupturing than a broadcast condition detectable when the transition portion has not yet undergone the deformation or rupturing.

13. The assembly of claim 5, wherein the brace comprises at least a third tab and a second transition portion connecting the third tab to the second tab, wherein the brace straddling the juncture further comprises the brace being arranged such that the third tab is arranged adjacent the first case piece and such that rotating the first case piece relative the second case piece and into the brace will further cause the third tab to be pushed by the first case piece and to undergo relative movement away from the second tab received in the gap of the first case piece and further cause the second transition portion to undergo rupturing or deformation in response to the relative movement of the third tab away from the second tab.

14. A method performed by a tamper-evident assembly, the tamper-evident assembly comprising a first case piece, a second case piece releasably joined to the first case piece so as to define a juncture, and a brace arranged across the juncture so that a first tab of the brace connected to a second tab of the brace by a transition portion is anchored to the first case piece and so that the second tab is anchored to the second case piece and adjacent a gap in the first case piece, the method comprising:
   receiving the second tab in the gap of the first case piece in response to rotating of the first case piece relative to the second case piece about the juncture and toward the brace;
   pushing the first tab by the first case piece into relative movement away from the second tab received in the gap of the first case piece in response to the rotating of the first case piece relative to the second case piece about the juncture and toward the brace;
   undergoing rupture or deformation along the transition portion in response to the relative movement of the first tab away from the second tab; and
   exhibiting a tamper-evident indication that the first case piece and the second case piece have been rotated relative one another since the brace was installed on the case, the tamper-evident indication comprising the rupture or deformation along the transition portion.

15. The method of claim 14, wherein the first tab is anchored to the first case piece by at least a first prong and the second tab is anchored to the second case piece by at least a second prong.

16. The method of claim 14, wherein the first case piece and the second case piece enclose an interior of the tamper-evident assembly.

17. The method of claim 16, wherein a computer-readable storage medium is arranged within the interior of the tamper-evident assembly.

18. The method of claim 14, wherein the tamper-evident indication is visually detectable.

19. The method of claim 18, wherein the tamper-evident indication is electrically detectable.

20. The method of claim 19, wherein the tamper-evident indication further comprises circuitry extending through the brace being detectable in a different condition based on the rupture or deformation along the transition portion than when the rupture or deformation has not yet occurred.

\* \* \* \* \*